(12) United States Patent
Kang

(10) Patent No.: US 10,464,625 B2
(45) Date of Patent: Nov. 5, 2019

(54) RIDING LUGGAGE STORAGE SYSTEM AND RIDING VEHICLES

(71) Applicant: SHENZHEN RIDER THINKING TECHNOLOGIES CO., LTD., Shenzhen (CN)

(72) Inventor: Zhifeng Kang, Shenzhen (CN)

(73) Assignee: SHENZHEN RIDER THINKING TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/977,319

(22) Filed: May 11, 2018

(65) Prior Publication Data

US 2018/0327043 A1  Nov. 15, 2018

(30) Foreign Application Priority Data

May 12, 2017  (CN) .......................... 2017 1 0334838

(51) Int. Cl.
*B62J 9/00* (2006.01)
*A45C 5/03* (2006.01)
*A45C 13/26* (2006.01)
*A45C 5/14* (2006.01)

(52) U.S. Cl.
CPC ............... *B62J 9/006* (2013.01); *A45C 5/03* (2013.01); *A45C 5/14* (2013.01); *A45C 13/262* (2013.01); *A45C 2013/267* (2013.01)

(58) Field of Classification Search
CPC ......... A45C 2013/267; A45C 2003/005; B62J 9/006

USPC .................................. 224/417, 430, 582–583
See application file for complete search history.

(56) References Cited

U.S. PATENT DOCUMENTS

| | | | | |
|---|---|---|---|---|
| 4,433,802 A * | 2/1984 | Woolf | ........................ | B62J 9/00 224/153 |
| 4,580,706 A * | 4/1986 | Jackson | ..................... | B62J 9/00 224/417 |
| 7,143,912 B2 * | 12/2006 | Caneba | ................ | A45C 13/262 224/153 |
| 2002/0005421 A1* | 1/2002 | Campbell | ................ | B62J 9/001 224/430 |
| 2002/0066763 A1* | 6/2002 | Hsueh | .................... | A63B 55/00 224/583 |
| 2009/0301833 A1* | 12/2009 | Hymas | ..................... | A45C 5/14 190/18 A |
| 2013/0213753 A1* | 8/2013 | Salek | ................... | A45C 13/385 190/18 A |

(Continued)

FOREIGN PATENT DOCUMENTS

CN           201849566 U       6/2011

*Primary Examiner* — Adam J Waggenspack
(74) *Attorney, Agent, or Firm* — Heslin Rothenberg Farley & Mesiti P.C.; Victor A. Cardona, Esq.

(57) ABSTRACT

A riding luggage storage system includes two side boxes symmetrically arranged, a side box pull rod movably arranged on each of the side boxes, a rolling structure installed on the outer lateral side of each side box, and two side boxes quickly mountable to form a draw-bar box. The luggage storage system has a compact and reasonable integral structure, and has at least one side boxes, with movably installed pull rods. A box body can be carried directly and artificially and moved between different places directly. The box body is easy to carry and suitable for carrying by riding vehicles such as motorcycles and bicycles.

8 Claims, 12 Drawing Sheets

(56) References Cited

U.S. PATENT DOCUMENTS

2017/0354217 A1* 12/2017 Taylor .................. A45C 5/03
2019/0037990 A1* 2/2019 Ayhan .................. A45C 5/14

* cited by examiner

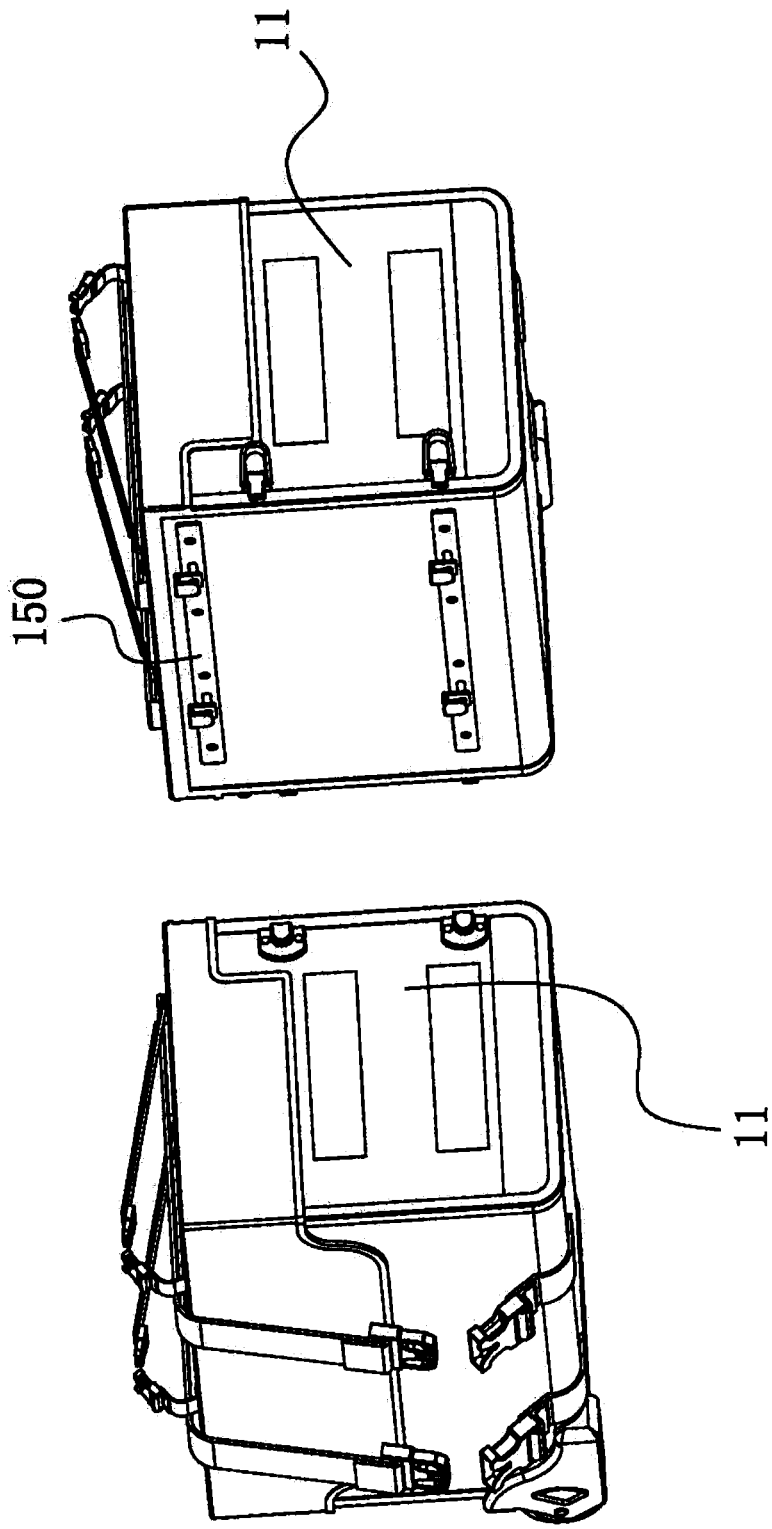

RIDING LUGGAGE STORAGE SYSTEM AND RIDING VEHICLES

CROSS-REFERENCE TO RELATED APPLICATION

The present application claims priority to China Patent Application number 201710334838.8 entitled "RIDING LUGGAGE STORAGE SYSTEM AND RIDING VEHICLE", filed on May 12, 2017, the entire disclosure of which is incorporated herein by reference.

TECHNICAL FIELD

The present invention belongs to the technical field of riding storage system, and relates to a riding luggage storage system and riding vehicles.

BACKGROUND OF THE INVENTION

When travelling by riding vehicles such as motorcycles and bicycles in our daily life, we usually need to carry special items such as riding gear, camping equipment, picnic equipment, car repair tools, etc. in addition to conventional luggage, which results in great volume and weight of the riding luggage.

At present, the ridding luggage system includes the following modes.

First, two separate aluminum alloy or plastic boxes are mounted on the luggage rack of the motorcycle rear seat to form a luggage system in the form of side boxes. For such a rigid box, various luggage bags such as haversacks and backpacks are placed inside when in use, to form a two-stage luggage storage system without directly carrying the box.

Second, the two luggage bags are connected by a belt in the middle to form a pouch, which is mounted on the rear seat of a motorcycle or a bicycle, called a luggage pack, a saddle bag or a side bag. This type of ridding bags can be directly brought to the accommodation places or carried artificially in the airport or station.

In addition, there is a top pocket or a top box in addition to the luggage bags on both sides of the vehicle body, that is, the box bags are fixed to the rear seat or the rear shelf of the motorcycle or the bicycle in a mounting or binding way.

These methods are the main methods for luggage storage, and they have the following drawbacks. When these luggage are carried artificially in the airport, the station (vehicle rental), parking site or accommodation place, it is very inconvenient to bring the non-ergonomically designed luggage by hands or shoulders for adapting to the carrying on bicycles and motorcycles.

In summary, motorcycles and bicycles have obvious limitations on the space and mode of carrying luggage compared to automobiles. In order to adapt to the riding baggage system for carrying on motorcycles and bicycles, it is difficult to meet the convenience for carrying by people. Therefore, it is necessary to design a luggage storage system that is convenient to carry, to adapt to and conform to the carrying ways of riding vehicles such as motorcycles and bicycles.

BRIEF SUMMARY OF THE INVENTION

The object of this present invention is to overcome the above problems in the prior art and provide a riding luggage storage system that is easy to carry and riding vehicles.

The object of the present invention can be achieved through the following technical solutions: A riding luggage storage system, comprising two side boxes symmetrically arranged, further comprising a side box pull rod movably arranged on each of the side boxes, and a rolling structure installed on the outer lateral side of each side box, and two side boxes can be quickly mounted to form a draw-bar box.

As a further improvement of the present invention, the side boxes are arranged symmetrically and the side box pull rods of the two side boxes are matched with each other. The two side boxes can be quickly installed into a draw-bar box, at this time, the two side box pull rods can be pulled out from each corresponding one of the side boxes and buckle to form a draw-bar box pull rod.

As a further improvement of the present invention, each of the side box pull rods has a half-split handle of a draw-bar box pull rod, and the head of each half-split handle is respectively provided with a mutually matched plug structure, and two half-split handles are locked by a sunken metal buckle structure after engagement.

As a further improvement of the present invention, the side box pull rod is disposed near the assembly position of the corresponding side box and is located at the outer middle position of the quickly-assembled draw-bar box. A single wheel is provided as the rolling structure of each side box, and the wheel is located at a side corner of the bottom of the corresponding side box and located at the same side of the side box as the corresponding side box pull rod.

As a further improvement of the present invention, a support leg corresponding to the wheel is installed at the bottom of the side box, and the support leg and the corresponding wheel are diagonally disposed on the same side of the corresponding side box, and the bottom of the support leg and the bottom of the corresponding wheel are on the same plane.

As a further improvement of the present invention, two side boxes can be quickly assembled into a draw-bar box through a metal buckle structure. The metal buckle structure comprises at least one metal buckles. The metal buckle comprises a locking end and an operating end disposed at the two side boxes respectively.

As a further improvement of the present invention, the metal buckles are arranged in an even number and symmetrically distributed on a quickly-assembled draw-bar box.

As a further improvement of the present invention, the riding luggage storage system further comprises a top pocket that can be placed on the top of the side box or the top of the draw-bar box.

As a further improvement of the present invention, the top of the side box or the top of the draw-bar box and the bottom of the top pocket are fixedly connected by a hook and loop, and a fixing strap that buckles on the side box pull rod or the draw-bar box pull rod is provided on the side of the top pocket.

As a further improvement of the present invention, at least one limiting mechanisms for limiting at the time of quick mounting are provided on each side box, and the limiting mechanism comprises a plug head and a plug hole disposed on the two side boxes respectively.

As a further improvement of the present invention, a length-adjustable load-bearing strap is installed outside the side box.

A riding luggage storage system, comprising two side boxes symmetrically arranged, further comprising a side box pull rod movably arranged on the side boxes, and two side boxes can be quickly mounted to form a draw-bar box, at this time, the two side box pull rods can be pulled out from the corresponding side boxes and buckle to form a draw-bar box pull rod; universal wheels are provided at two corners of the side box bottom respectively, and four universal wheels are respectively located at the four corners of the bottom of the quickly-assembled draw-bar box.

A riding luggage storage system comprises two symmetrically arranged side boxes, and a side box pull rod is movably arranged on one side box, and the two side boxes can be quickly mounted to form a draw-bar box, at this time, the side box pull rods from a draw-bar box pull rod; a wheel is installed at a corner of the side box bottom, and two wheels are arranged at two corners of the bottom of the quickly-assembled draw-bar box. The two wheels and the side box pull rods are arranged on the same side.

A riding vehicle, comprising a rear seat and a riding luggage storage system described above, and the side boxes are mounted on the rear seat, and the two side boxes are arranged on both sides of the rear seat respectively.

A riding vehicle comprises a rear seat installed with a side box bracket and a riding luggage storage system described above. A hanging mechanism is provided on opposite sides of two side boxes, and the side boxes are mounted on the side box bracket through a hanging mechanism. Two side boxes are arranged on both sides of the rear seat respectively.

A riding vehicle comprises a rear seat installed with a luggage bracket and a riding luggage storage system described above. Rigid side boxes are installed on the luggage bracket, and each of the side boxes of the riding luggage storage system is arranged to fit to the inner lined box structure of the rigid side box and is built into the corresponding rigid side box.

Based on the foregoing technical solutions, embodiments of the present invention can at least produce the following technical effects. The luggage storage system has a compact and reasonable integral structure, and it comprises at least one side box, with movably installed pull rods. The box body can be carried directly and artificially and moved between different places directly. It is easy to carry and suitable for carrying by riding vehicles such as motorcycles and bicycles.

BRIEF DESCRIPTION OF THE SEVERAL VIEWS OF THE DRAWINGS

The present invention is further described in combination with drawings.

FIG. 12 is a schematic structural diagram of a riding luggage storage system of a riding vehicle according to another preferred embodiment of the present invention.

DETAILED DESCRIPTION OF THE INVENTION

The present invention is further described in combination with the following specific embodiments and the accompanying drawings. However, the present invention is not limited to these embodiments.

In the prior art, the riding vehicles such as motorcycles and bicycles, have obvious limitations in the space and way for carrying luggage compared to automobiles. In order to adapt to the riding luggage system of the riding vehicles such as motorcycles and bicycles, it is difficult to solve the problem of convenience when carrying luggage. The present invention is directed to design an innovative luggage system product that is suitable for carrying by riding vehicles such as motorcycles and bicycles and moving luggage in airports, stations, accommodation places and parking places.

The present invention protects a riding luggage storage system that is suitable for riding vehicles such as motorcycles and bicycles, which is applicable to motorcycles and bicycles and other riding vehicles.

The technical solutions provided by the present invention will be described in details with reference to FIG. 1 to FIG. 12.

As shown in FIG. 1 to FIG. 4, the present riding luggage storage system comprises a plurality of side boxes 11 arranged symmetrically, and the side boxes 11 being movably disposed with side box pull rod 121 that can be pulled. The side box pull rod 121 is movably installed on the side box 11, so that the side box 11 is easy to drag between different moving places and the side box pull rod 121 can be pulled out during use. During transportation and storage, the side box pull rods 121 are returned to the storage position of the side boxes 11; luggage and other items are stored inside the side boxes 11. A rolling structure that can be rolled on the ground is mounted at the outside each of the side boxes 11, and the rolling structures matches with the side box pull rods 121 to ensure that the side boxes 11 are dragged flexibly and conveniently and it is practical and labor-saving.

The luggage storage system has a compact and reasonable structure, and it comprises at least one side box 11, with movably installed pull rods that can be pulled and hand-held. The box body can be carried directly and artificially and moved between different places directly. It is easy to carry and suitable for carrying by riding vehicles such as motorcycles and bicycles, conforming to the ergonomic design; in addition, it is labor-saving and comfortable to use.

In the present embodiment, when one or multiple side boxes 11 are set, the side box 11 may be dragged alone, or a plurality of side boxes 11 may be assembled into one box and dragged, just by making an adaptable adjustment of the pull rod and the rolling structure.

One side box pull rod may be set on one of the side boxes, and the side boxes 11 may be assembled into one box body that is dragged by a single pull rod.

Figure 5:
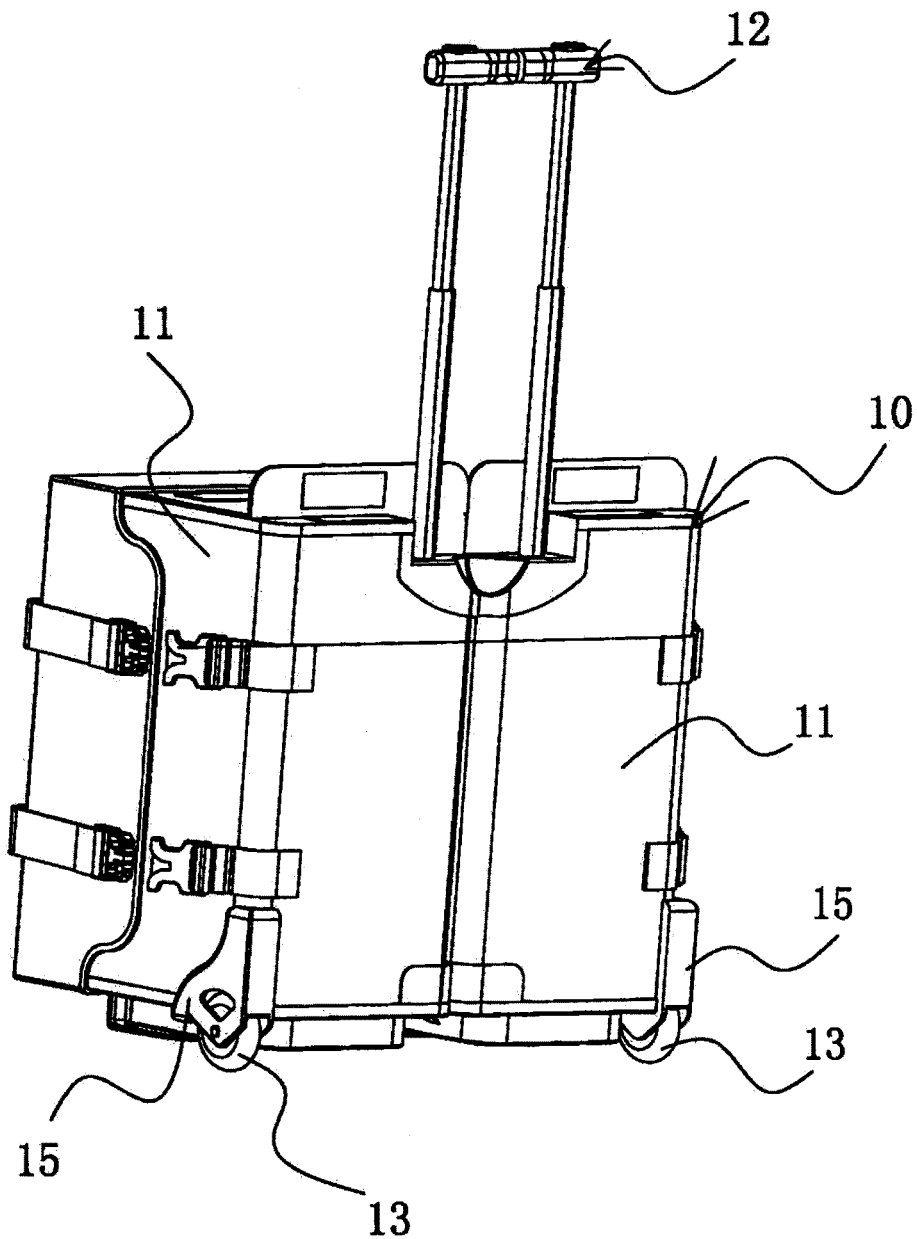
FIG. 5 is a schematic structural diagram of two side boxes that are ready to be dragged after quickly mounted to a draw-bar box according to a preferred embodiment of the present invention.
Figure 6:
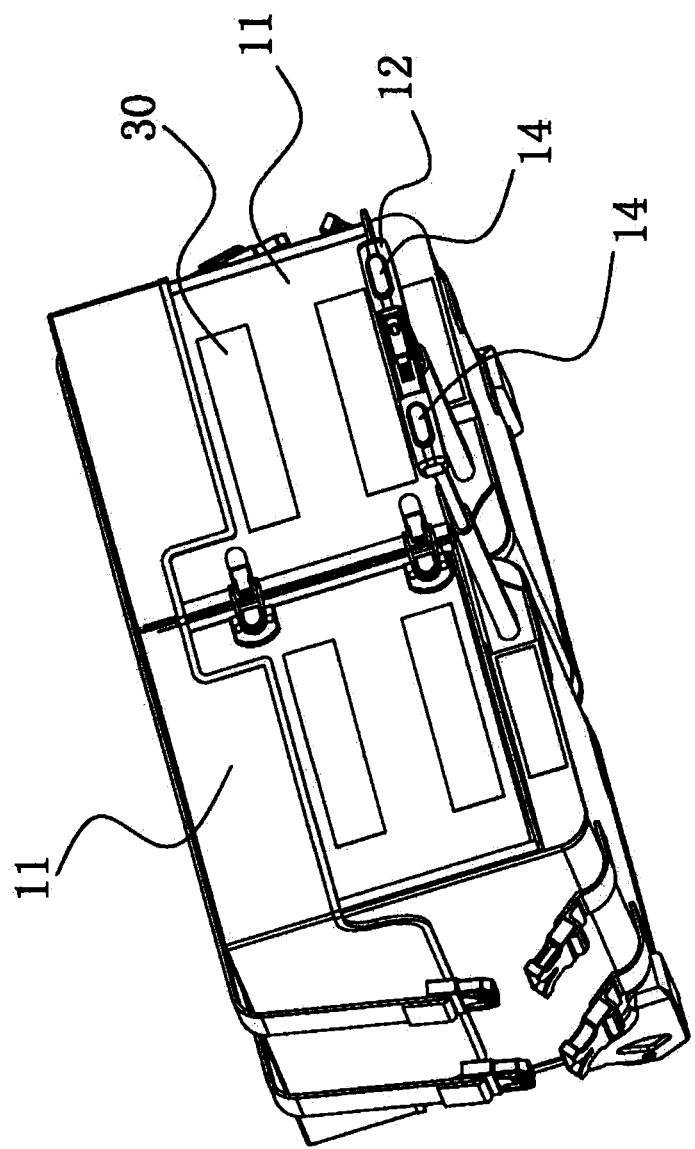
FIG. 6 is a schematic structural diagram of FIG. 5 from another angle of view.

As shown in FIG. 5 and FIG. 6, as a preferred or optional embodiment, preferably two side boxes 11 are disposed symmetrically. Correspondingly, each side box 11 is provided with a side box pull rod 121, and the side box pull rods 121 of the two side boxes 11 cooperate with each other, and the two side boxes 11 can be quickly mounted as a draw-bar box 10. At this time, the corresponding side boxes 11 can be pulled out by the two side box pull rods 121 respectively and buckled to form a draw-bar box pull rod 12.

That is, the two side boxes 11 can be rapidly assembled into one draw-bar box 10, and the respective side box pull rods 121 of the two side boxes 11 are pulled out and buckled to form a double pull rod (draw-bar box pull rod 12).

In this embodiment, two side boxes 11 are provided with a pull rod each before assembly; and when pulled out, the pull rods are buckled as a double pull rod. Since the two side boxes 11 have pull rods before assembly, the force exerted on the pull road is most symmetrical when the assembled draw-bar box 10 is used, and it is most stable when dragged.

Further, as shown in FIG. 6, the side box pull rods 121 each has a half-split handle of a draw-bar box pull rod 12, and the head portion of each half-split handle is respectively provided with a mutually matched plug structure. When inserted, two half-split handles are locked by a sunken metal buckle structure. The metal buckle structure that is disposed on the handle of the draw-bar box pull rod 12 in a sinking manner makes the top of the pull rod smooth and flat, to prevent touching hands, making comfortable to use. The metal buckle is preferably disposed in the middle of the handle of the draw-bar box pull rod 12.

In this embodiment, each of the two side boxes 11 has a side box pull rod 121. After being pulled out, they can be assembled into a double pull rod. The two side box pull rods 121 each have a half-split handle. The handle head portion has a plug structure and is mounted with a metal buckle in a sinking manner (a single metal buckle structure is provided on the draw-bar box pull rod 12 described above). When the plug is inserted and the buckle is locked, it forms a handle of a draw-bar box pull rod 12.

Further preferably, two buttons 14 are designed on the handle top of the draw-bar box pull rod 12 to respectively control the release and locking of pulling the side box pull rods 121, which is reliable and easy to use.

In order to ensure the tightness between the rolling structure and the pull rod and ensure the convenience for use and dragging, preferably each of the side box pull rods 121 is disposed near the assembly position of the each corresponding side box 11 and located at the middle position outside the quickly-assembled draw-bar box 10. Each of the rolling structures on each side box 11 are set as a single wheel 13. Each of the wheel 13 is located at one corner of the bottom of the corresponding side box 11 and on the same side of the side box 11 as the corresponding side box pull rod 121; and preferably each of the wheel 13 and the handle of the corresponding side box pull rod 121 are arranged diagonally, that is, the connection between the two is a diagonal line on the side of the side box 11. The design of the side box 11 of the luggage storage system is more in line with the engineering mechanics. When dragging, the wheel 13 is subjected to even force, to achieve stable dragging and enhance the service life.

The outer lateral portion of the side box 11 is defined for setting the pull rod and the wheel 13, the top is close to the handle of the pull rod and the bottom is close to the wheel 13. A wheel 13 is mounted on the outer bottom corners of the above two side boxes 11, and one pull rod is designed at the outer lateral portion. In this embodiment, side boxes 11 are preferably rigid boxes, and the outer layer of the box can adopt waterproof fabric, leather, PU leather, metal, plastic and other materials according to different styles, with wide applications.

Further, each wheel 13 is detachably mounted on the corner of the corresponding side box 11 through the wheel base 15, and the wheel base 15 is preferably wrapped and installed at the corners of the corresponding side box 11 and respectively contacts with at least two outer sides of the corresponding side box 11. One of the outer sides includes the end face of the outer lateral portion of the side box 11 defined above, so that there is one wheel base 15 at the bottom corner of each of the two side boxes 11 in the present invention, which forms a draw-bar box wheel 13 after quickly assembled to a draw-bar box 10.

Figure 4:
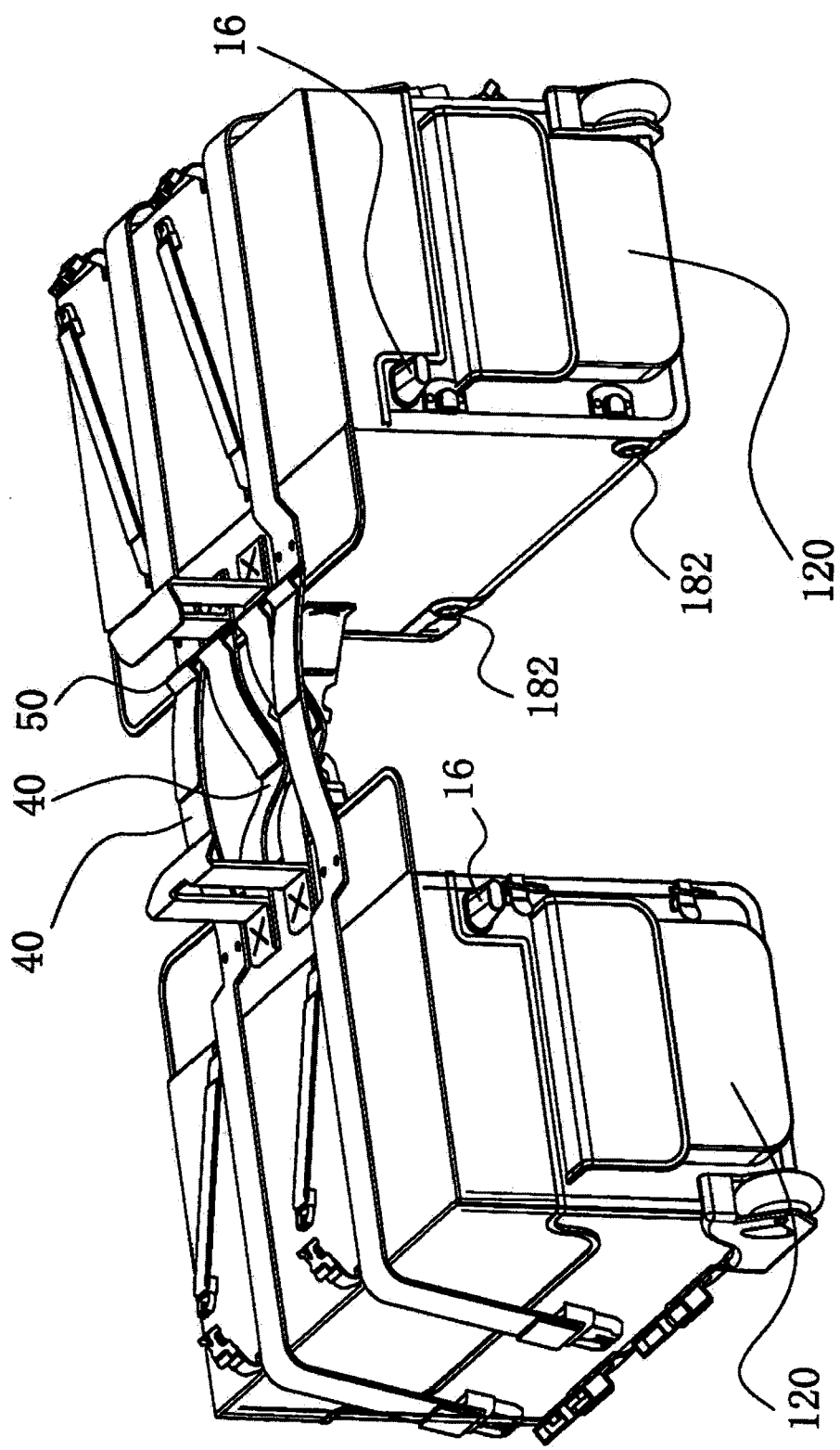
FIG. 4 is a schematic structural diagram of FIG. 3 from another angle of view.

Further, as shown in FIG. 4, a support leg 16 corresponding to the wheel 13 is installed at the bottom of the side box 11, and the support leg 16 and the corresponding wheel 13 are diagonally disposed at the same side of the corresponding side box 11, that is, the connection line between them is a diagonal line on the side of the side box 11. The support leg 16 is preferably arranged near the installation position of the side box 11, and the bottom of the support leg 16 is in the same plane as the bottom of the corresponding wheel 13.

In the present invention, two side boxes 11 are provided, each having a box support leg 16, the bottom of which is on the same plane as the bottom of the wheel 13. Preferably, the two wheels 13 of the draw-bar box 10 and the bottoms of the two support legs 16 are on the same plane, to guarantee balanced standing of the draw-bar box 10 after assembled.

Preferably, the side box 11 is quickly assembled by a rigid locking method and securely fastened. Specifically, the two side boxes 11 can be quickly assembled into a draw-bar box 10 by a metal buckle structure. The metal buckle structure comprises at least one metal buckle 17. The metal buckles 17 include a fixed locking end 171 and a movable operating end 172 disposed on the two side boxes 11 respectively.

Specifically, the side boxes 11 are quickly assembled into a box body with at least one metal buckles 17, and if the locking end 171 is placed on the box body of the side box 11 on the left, the corresponding operating end 172 is placed on the box body of the side box 11 on the right, and the locking end 171 and the operating end 172 are located close to the quick mounting position (i.e., the assembly position) of the side box 11. The aforementioned metal buckle structure for locking the draw-bar box handle is also preferably the same single metal buckle 17, and the metal buckle is disposed in a sinking manner, to avoid touching hands.

Figure 1:
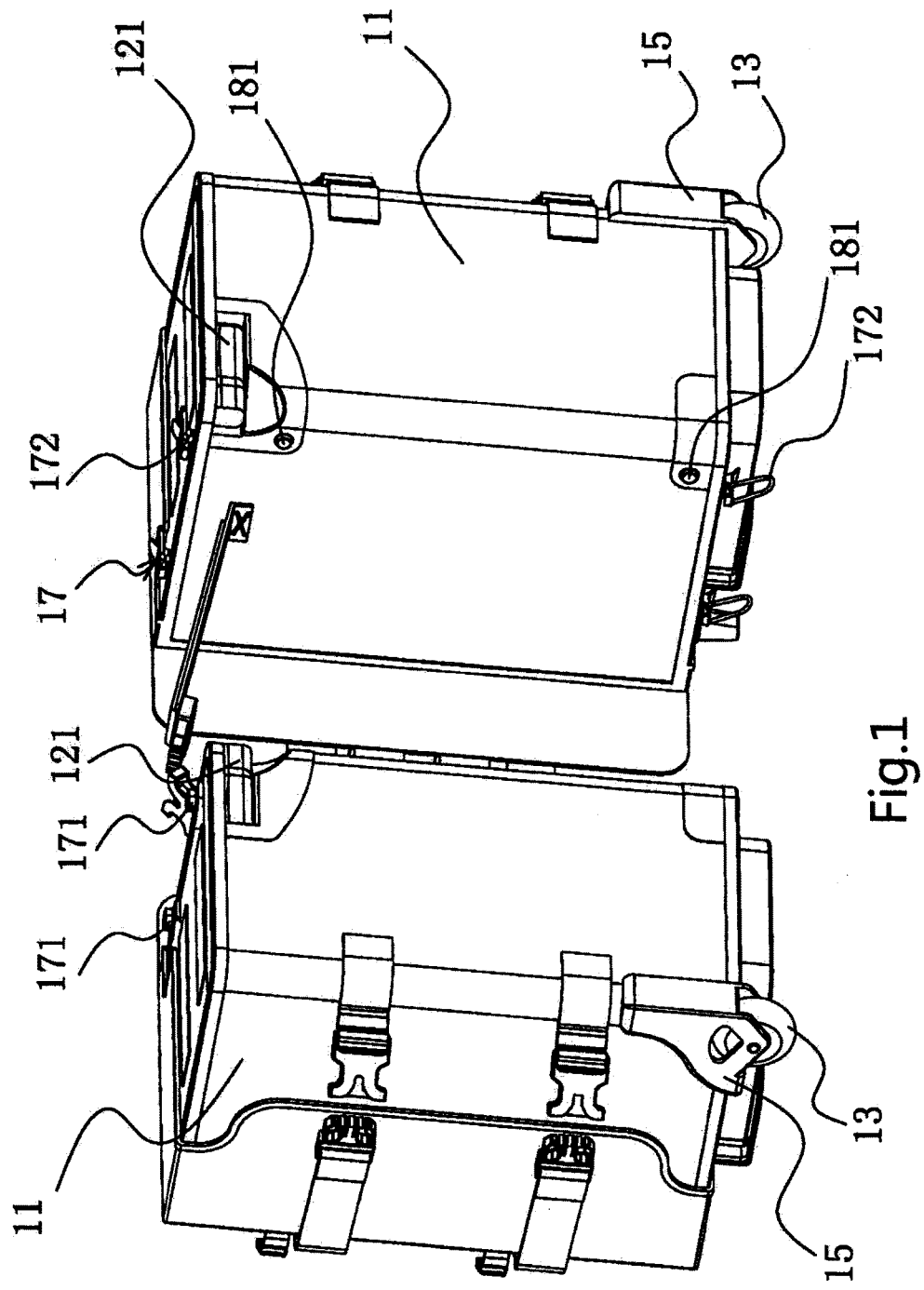
FIG. 1 is a schematic structural diagram of a luggage storage system according to a preferred embodiment of the present invention.
Figure 2:
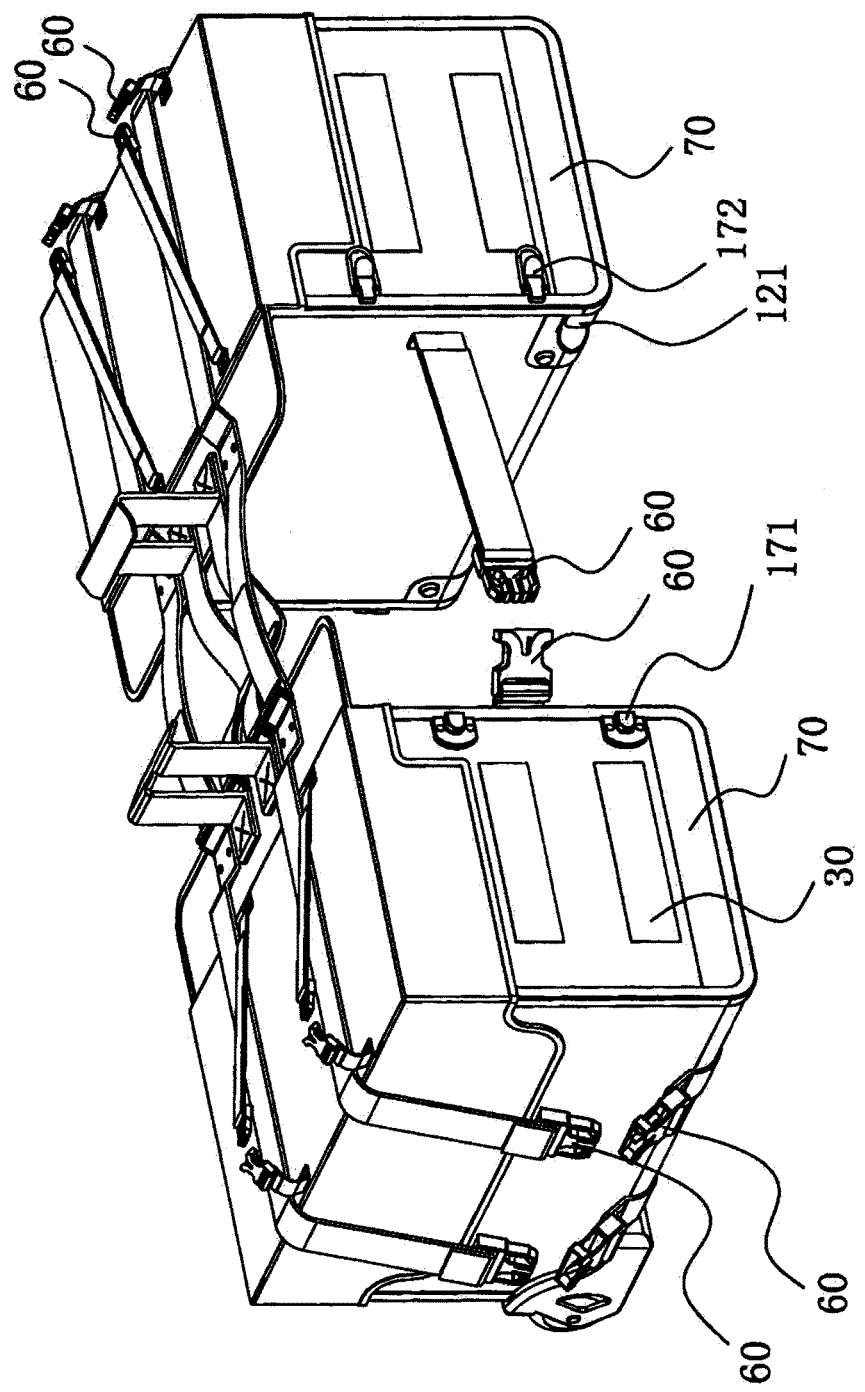
FIG. 2 is a schematic structural diagram of a luggage storage system when mounted on a riding vehicle or disposed on the ground according to a preferred embodiment of the present invention.

In order to make the side box 11 installed quickly and easily and fixed securely, preferably the metal buckles are arranged in an even number and symmetrically distributed on a quickly-assembled draw-bar box 10. Further preferably, as shown in FIG. 1 and FIG. 2, four metal buckles 17 are symmetrically arranged at the joint portion of the top and bottom (assembly portion), and after locked, two side boxes 11 are quickly assembled into a box body, i.e. the box body of the draw-bar box 10.

In the present invention, the metal buckle 17 may belong to a part of partial riding luggage storage system, or a part of the riding luggage storage system, or may be used together with various components required for installation and fixing as a part of the riding luggage storage system. As required, other mechanical mechanisms can also be used to achieve the rigid locking of two side boxes 11.

Figure 7:
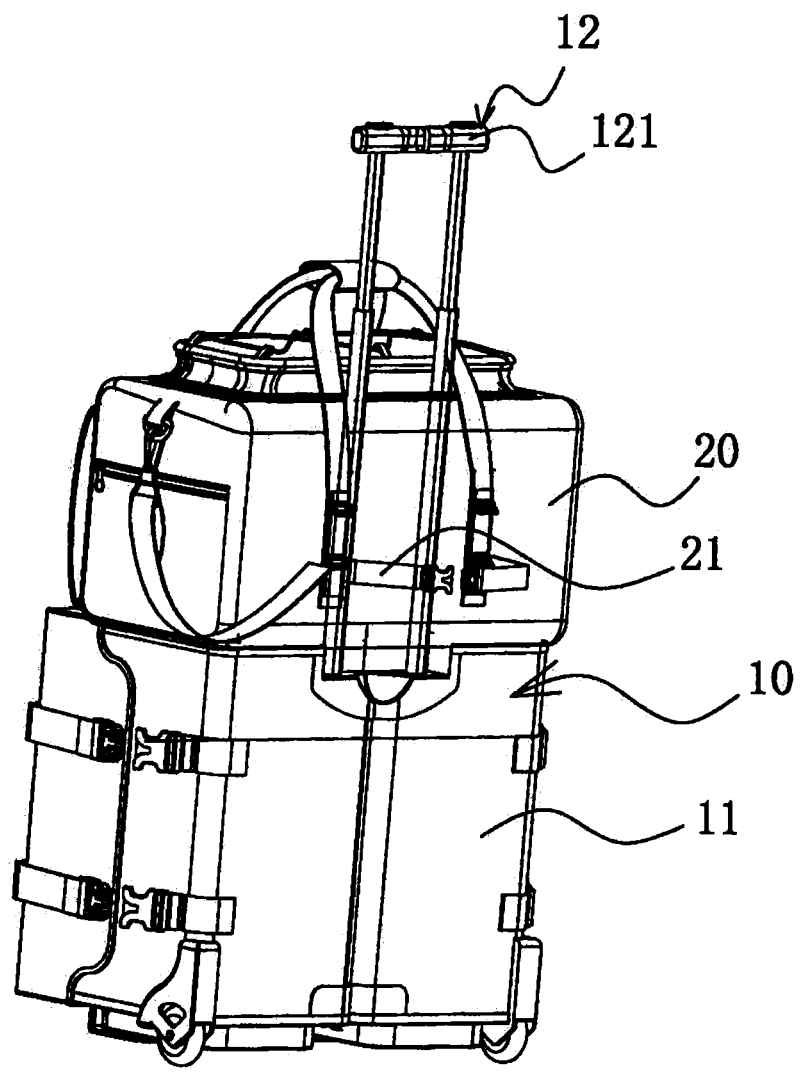
FIG. 7 is a schematic structural diagram of a draw-bar box fixed with a top pocket according to a preferred embodiment of the present invention.

In the present invention, as shown in FIG. 7, the riding luggage storage system further comprises a top pocket 20 which can be placed on the top of the side box 11 or placed on the top of the draw-bar box 10. When only a single side box 11 is provided, the top pocket 20 is placed on the top of the side box 11. The top pocket 20, the side box 11 and the corresponding connection accessories constitute the riding luggage storage system.

If the top pocket 20 is required in daily life, the top pocket 20 is placed at the top of the side box 11 or the top of the draw-bar box 10 after assembly. When dragged, the top pocket 20 will be displaced together, thus, it is convenient to use and very practical.

The wheel 13 is arranged on both sides of the bottom of the draw-bar box 10, and the support leg 16 is positioned at the middle of the bottom of the draw-bar box 10, preferably the top of the side box 11 or the top of the draw-bar box 10 is fixedly connected with the bottom of the top pocket 20 through hook and loop 30, and a fixing strap 21 that buckles on the side box pull rod 121 or the draw-bar box pull rod 12 is provided on the side of the top pocket 20.

During installation, the bottom of the top pocket 20 and the top of the side box 11/the top of the draw-bar box 10 are fixed by hook and loop 30, and a fixing strap 21 is provided on the side of the top pocket 20 to buckle on the pull rod. Further preferably, the top pocket 20 in this embodiment is placed at the top of the draw-bar box 10, that is, the top of the side box 11 is provided with hook and loop 30, and the draw-bar box 10, top pocket 20 and corresponding connection accessories constitute the riding luggage storage system.

Further, as shown in FIG. 1 and FIG. 4, at least one limiting mechanism for limiting is provided on each side box 11. The limiting mechanism comprises a plug head 181 and a plug hole 182 disposed on two side boxes 11 respectively.

Specifically, the plug head 181 in the present embodiment is also preferably configured as a convex plastic plug head 181 with a chamfer, and preferably, two limiting mechanisms are configured, i.e. two groups of plug heads 181 and plug holes 182, placed on the assembly side of the side box 11 respectively.

During the quick assembly, when the metal buckle 17 is locked in the previous step, the two plug heads 181 are inserted into the two plug holes 182, respectively, to further fix the assembled box body of the two side boxes 11 so that they do not produce minor sliding when dragging.

Figure 3:
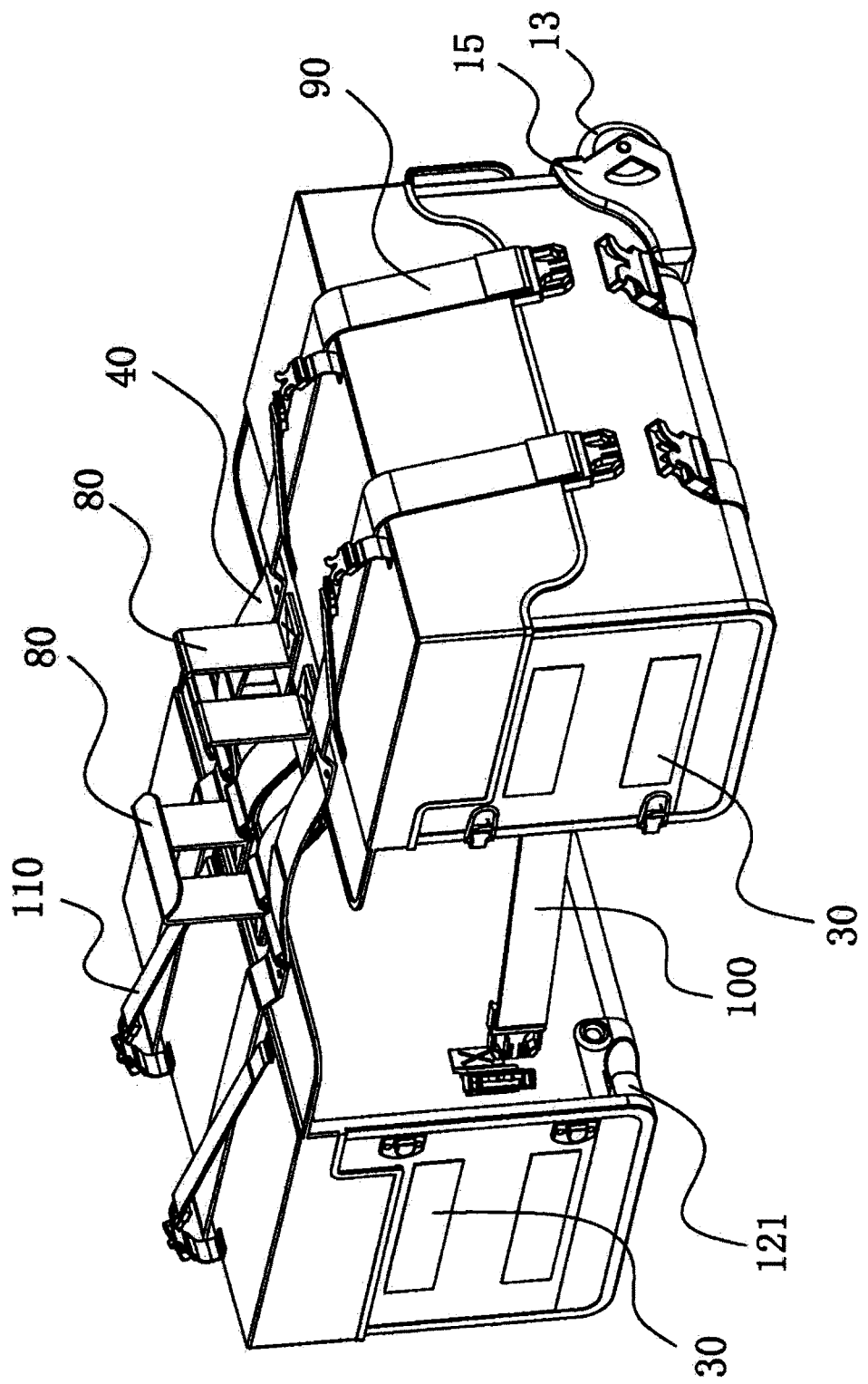
FIG. 3 is a schematic structural diagram of a rigging luggage storage system shown in FIG. 1 from another angle of view.

Preferably, as shown in FIGS. 3 and 4, a length-adjustable load-bearing strap 40 is mounted on the outside of the side box 11. The present invention further provides a regulating assembly 50 for adjusting the length of the load-bearing strap 40, preferably 2 to 4 regulating assemblies are provided according to different styles, which are used to connect two side boxes 11 and can be mounted on rear seats of riding vehicles such as motorcycles and bicycles, etc.

Figure 8:
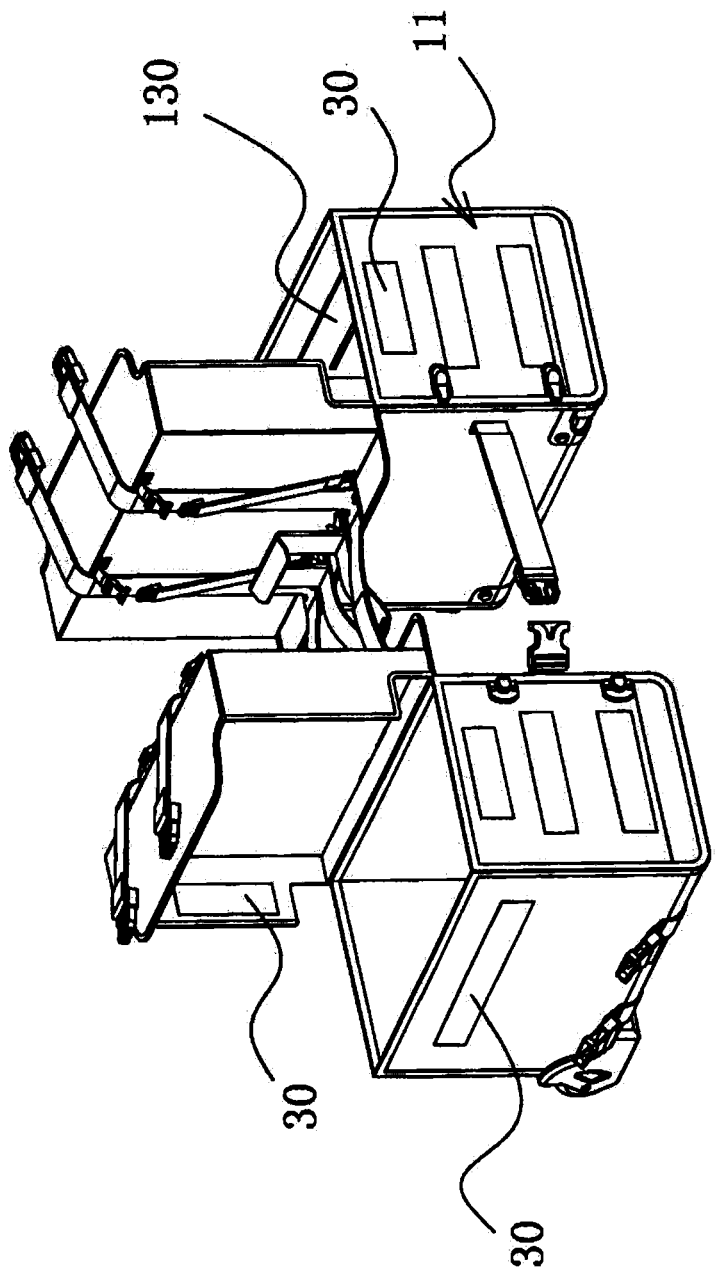
FIG. 8 is a schematic structural diagram of a side box in an open state according to a preferred embodiment of the present invention.

In the present invention, the functional belts are all buckled with a plastic buckle 60; further preferably, a reflective fabric 70 (which can be replaced with a reflective tape) is provided at the top of the side box 11, to ensure night driving safety. A pull rod is hidden behind the reflective fabric 70 (bottom); a soft carrying handle 80 is provided on the side of the side box 11, one for each of the two side boxes, which are used for loading and unloading of the side boxes 11. A length-adjustable flexible auxiliary belt 90 is mounted outside of the side box 11, two belts for each side box 11, which are used for tilting the side box 11 to the outside after tightened and buckled with plastic buckle 60, so that the side box 11 will not rub against the wheels of the riding vehicles while riding; A length-adjustable fixed auxiliary belt 100 is provided on the quickly-assembled side of the two side boxes 11, which is wrapped around the rear of a rack of a riding vehicle such as a bicycle or a motorcycle. It is used to fix the side box 11 after tightened and buckled with a plastic buckle 60 so that it does not slide forward when braking hard; there is also an extended luggage tie strap 110 on the outside of the side box 11, two straps at the top of each side box 11. The extended luggage tie strap is length-adjustable and buckled by a plastic buckle 60. An extended luggage platform is formed by two tie straps and the top of the side box 11, which is used for binding bundled tents, and other moisture-proof long-strip luggage. At the bottom of the side box 11, an external expansion pack 120 is provided to place small items that need quick access;

As shown in FIG. 8, the side box 11 in the present invention comprises a box body and a box lid. The outer side of the box body and the inside of the box lid are preferably fixed by a hook and loop 30. In the case of a zipper between the box body and the box lid, the box lid is mainly used for preventing rain; a built-in document bag 130 is provided in the side box 11, one for each side box 11, which is used for placing important documents and items.

Figure 9:
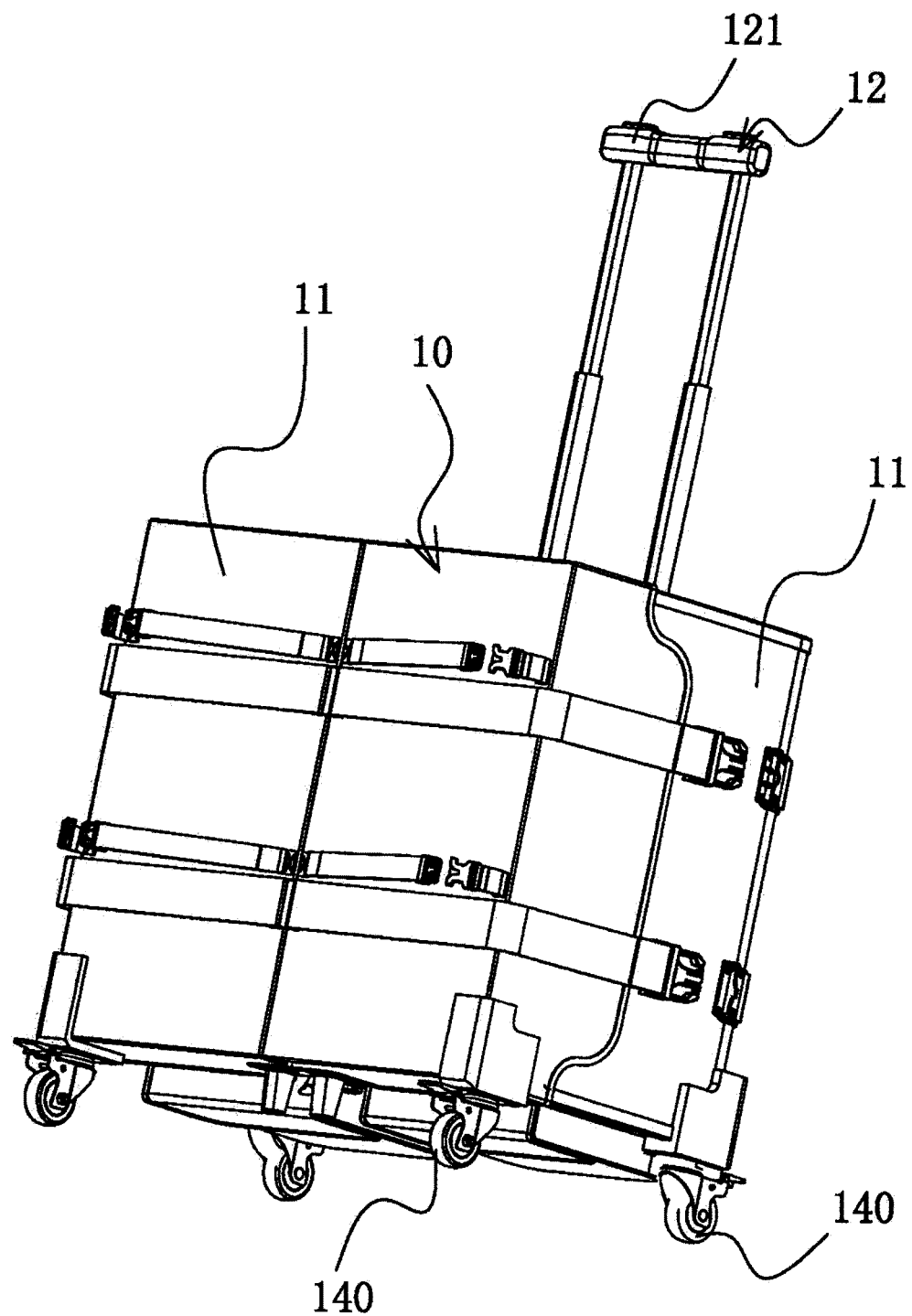
FIG. 9 is a schematic structural diagram of a riding luggage storage system according to a second embodiment of the present invention.

The present invention further protects an embodiment of a riding luggage storage system, as shown in FIG. 9, it comprises two side boxes symmetrically arranged, a side box pull rod 121 is movably arranged on the side boxes, and two side box pull rods 121 cooperate with each other. The two side boxes can be quickly mounted to form a draw-bar box, at this time, the two side box pull rods 121 can be used to pull out the corresponding side boxes and buckle to form a draw-bar box pull rod 12; universal wheels 140 are provided at two corners of the side box bottom respectively, and four universal wheels 140 are respectively located at the four corners of the bottom of the quickly-assembled draw-bar box.

Two universal wheels 140 are installed at the bottom corners of the two side boxes, so that there are four universal wheels 140 at the bottom corner of the assembled box body, thereby forming a draw-bar box system of a universal wheel 140; other settings are of no difference from the riding luggage storage system in the first embodiment.

Figure 10:
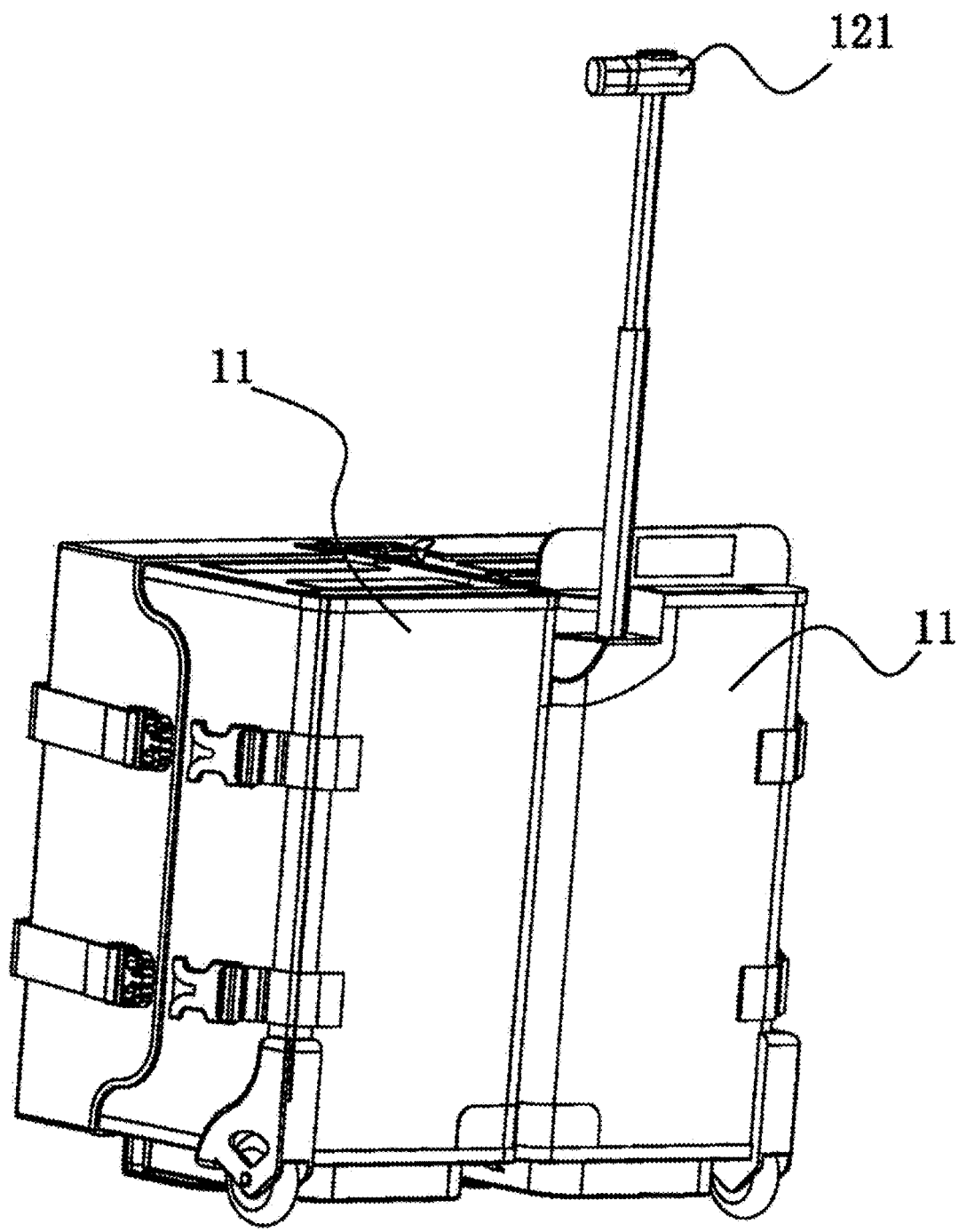
FIG. 10 is a schematic structural diagram of a riding luggage storage system according to a third embodiment of the present invention.

The present invention further protects an embodiment of a riding luggage storage system, as shown in FIG. 10, it comprises two side boxes arranged symmetrically, one side box is movably provided with a side box pull rod 121, and two side boxes may be quickly assembled into a draw-bar box, at this time, the side box pull rod 121 is a draw-bar box pull rod 12; wheels are mounted at the corners of the side box bottom, and two wheels are arranged at the two corners of the bottom of the quickly-assembled draw-bar box. The two wheels and the side box pull rod are arranged on the same side.

In this embodiment, in one of the two side boxes, a single rod pull rod is installed near the assembly side to form a single pull rod luggage box system, while the other settings are the same as the riding luggage storage system in the first embodiment. In this alternative, the single-rod pull rod cannot be absolutely centered in the assembled box, and another box body without a pull rod is forced by the metal buckle 17 during the dragging, when the top pocket 20 is required, the auxiliary straps of the top pocket 20 are obviously not stable enough on the single-rod pull rod, so this solution is not convenient and reliable as the main program, however, because it needs not to design a special double pull rod for assembly, the design and manufacture is simpler than that in the main program.

Figure 11:
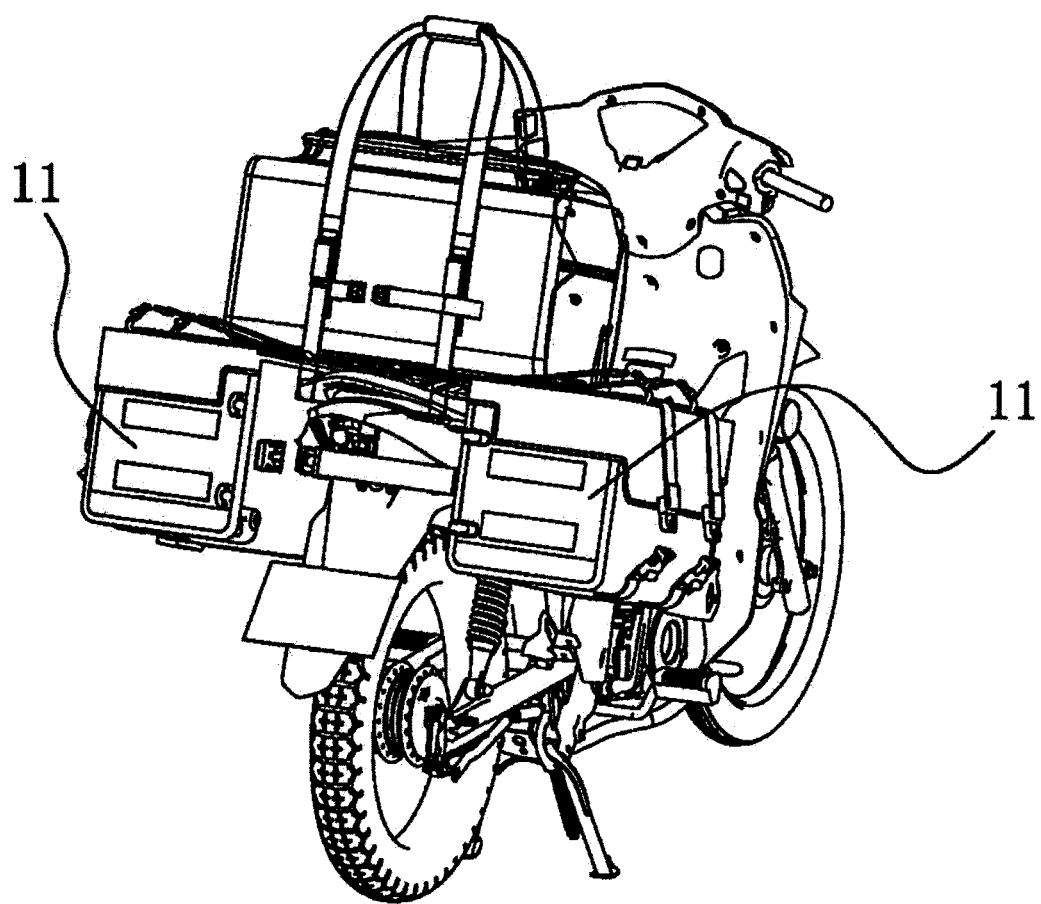
FIG. 11 is a schematic structural diagram of a riding vehicle according to a preferred embodiment of the present invention.

The present invention further protects riding vehicles that are compatible with the above-mentioned riding luggage storage system, i.e. riding vehicles that use the storage system. The riding vehicles are preferably motorcycles and bicycles, but are not limited thereto; specifically, as shown in FIG. 11, the embodiment of riding vehicles of the riding luggage storage system in the foregoing three embodiments is as follows: it comprises a rear seat and a riding luggage storage system described, and the side boxes are mounted on the rear seat and the two side boxes are arranged in both sides of the rear seat respectively.

Further, preferably, a luggage rack is installed on the rear seat so that the side box can be mounted on the luggage rack and the two side boxes are arranged on both sides of the luggage rack respectively.

The present invention further protects a riding vehicle, as shown in FIG. 12, which comprises a rear seat with a side box bracket installed therein and a riding luggage storage system described above. A hanging mechanism 150 is provided on the respective opposite side of the two side boxes. The side box is mounted on the side box bracket through a hanging mechanism 150, and the two side boxes are arranged on both sides of the rear seat respectively.

Specifically, for rear racks of bicycles and side box brackets of rear seat of some motorcycles, the load-bearing strap 40 connecting the two side boxes in the main program may be omitted, and instead, a hanging mechanism 150 may be designed inside the side box. When using, two side boxes are respectively mounted on the side box bracket. The two rows of hanging mechanisms 150 on the box body can be correspondingly designed according to different models, with wide versatility.

Further, for some riding vehicles such as motorcycles, since metal or plastic rigid side box has been installed on the luggage bracket, a lined box can be designed inside the side box, to achieve the present invention based on the concept of the lined box. That is, the product of the present invention is omitted from the load-bearing strap 40 and the hanging mechanism 150, and it is built into an original side box of a riding vehicle such as a motorcycle while riding.

Specifically, the present invention further protects a riding vehicle, including a rear seat installed with a luggage bracket and the foregoing riding luggage storage system, and a rigid side box (i.e. an original side box structure of riding vehicle) is mounted on the luggage bracket. The side box involved in the present invention (i.e., the side box of the foregoing luggage storage system) is set to fit the inner lined box structure of the original rigid side box and is built in the original rigid side box.

Further, preferably there are two rigid side boxes arranged symmetrically, correspondingly, two side boxes are provided in this embodiment, and the mounting components such as the load-bearing strap 40 are omitted for this side box.

The specific embodiments described herein are merely illustrative of the spirit of the invention. Those skilled in the art may make various modifications or additions to the described embodiments or replace them in a similar manner without departing from the spirit of the present invention or exceeding the scope defined in the appended claims.

The invention claimed is:

1. A riding luggage storage system, comprising a draw-bar box formed from two separable side boxes, the draw-bar box including a draw-bar box pull rod movably mounted on the draw-bar box, the draw-bar box pull rod including a releasable fastener to separate the draw-bar box pull rod into two side box pull rods, with one side box pull rod movably arranged on each of the side boxes; the draw-bar box including two wheels arranged at two corners of the bottom of the draw-bar box; the two wheels and the draw-bar box pull rod are arranged on the same side in order to allow a user to pull the draw-bar box on the wheels via the draw-bar box pull rod.

2. The riding luggage storage system according to claim 1, wherein each of said side box pull rods of said plurality of side box pull rods has a half-split handle of said draw-bar box pull rod, and the head of each half-split handle is respectively provided with a mutually matched plug structure, and two half-split handles are locked by a sunken metal buckle structure after engagement.

3. The riding luggage storage system according to claim 1, wherein the first side box pull rod is disposed near the assembly position of the corresponding side box and is located at the outer middle position of the quickly-assembled draw-bar box; said rolling structure of each side box is set as a single wheel, and the wheel is located at a side corner of the bottom of the corresponding side box and located at the same side of the side box as the first side box pull rod.

4. The riding luggage storage system according to claim 1, wherein the two side boxes can be quickly assembled into the draw-bar box through a metal buckle structure; the metal buckle structure comprises at least one metal buckles; the metal buckle comprises a locking end and an operating end disposed at the two side boxes respectively.

5. The riding luggage storage system according to claim 1, comprising a top pocket that can be placed on the top of the side box or the top of the draw-bar box.

6. The riding luggage storage system according to claim 5, wherein the top of the side box or the top of the draw-bar box and the bottom of the top pocket are fixedly connected by a hook and loop, and a fixing strap buckling on the side box pull rod or the draw-bar box pull rod is provided on the side of the top pocket.

7. The riding luggage storage system according to claim 1, wherein at least one limiting mechanisms for limiting at the time of quick mounting are provided on each side box, and the limiting mechanism comprises a plug head and a plug hole disposed on the two side boxes respectively.

8. A riding vehicle, comprising a rear seat and a riding luggage storage system according to claim 1, wherein the two side boxes are mounted on the rear seat, and are arranged on both sides of the rear seat respectively.

* * * * *